United States Patent
Lai et al.

(10) Patent No.: US 12,207,154 B2
(45) Date of Patent: Jan. 21, 2025

(54) METHOD FOR PROVIDING BETTER CONNECTING SIGNALS, ELECTRONIC DEVICE AND COMPUTER READABLE STORAGE MEDIUM

(71) Applicant: Nanning FuLian FuGui Precision Industrial Co., Ltd., Nanning (CN)

(72) Inventors: Wei-Fan Lai, New Taipei (TW); Yung-Ming Chou, New Taipei (TW)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 381 days.

(21) Appl. No.: 17/708,164

(22) Filed: Mar. 30, 2022

(65) Prior Publication Data

US 2023/0319501 A1 Oct. 5, 2023

(51) Int. Cl.
*H04W 4/02* (2018.01)
*H04B 17/327* (2015.01)

(52) U.S. Cl.
CPC .......... *H04W 4/023* (2013.01); *H04B 17/327* (2015.01)

(58) Field of Classification Search
None
See application file for complete search history.

(56) References Cited

U.S. PATENT DOCUMENTS

2016/0295499 A1* 10/2016 Tavildar ................ H04W 8/005
2023/0087414 A1* 3/2023 Opshaug ................... G01S 5/08
455/456.1

FOREIGN PATENT DOCUMENTS

CN 109348501 B 9/2020
CN 111629321 A 9/2020

* cited by examiner

*Primary Examiner* — Frantz Bataille
(74) *Attorney, Agent, or Firm* — ScienBiziP, P.C.

(57) ABSTRACT

A method for providing better connecting signals is disclosed. Coordinates of multiple mobile terminals are obtained. Distances between a mobile Wi-Fi (MIFI) device and the mobile terminals are calculated according to received signal strength indicator (RSSI) values between the mobile terminals and the MIFI device, and a relative coordinate of the MIFI device is then calculated based on the distances. Unit vectors of the mobile terminals relative to the MIFI device are calculated according to the relative coordinate of the MIFI device and the coordinates of the mobile devices. Reference signal receiving power (RSRP) values of the mobile terminals are calculated and are multiplied by the unit vectors to obtain RSRP vectors of the mobile terminals. The RSRP vectors are added up to generate a position where the MIFI device moves to a base station.

3 Claims, 4 Drawing Sheets

METHOD FOR PROVIDING BETTER CONNECTING SIGNALS, ELECTRONIC DEVICE AND COMPUTER READABLE STORAGE MEDIUM

BACKGROUND

Technical Field

The disclosure relates to network communications, and more particularly to a method for providing better connecting signals, electronic device and computer readable storage medium.

Description of Related Art

A wireless data terminal (Mobile Wi-Fi, MIFI) device is a portable wireless Internet access device that can convert 4G network signals into Wi-Fi signals for terminal devices that support Wi-Fi connections to connect to the Internet. In other words, the MIFI devices are portable Wi-Fi devices.

A mobile terminal device is connected to the MIFI device and thus has networking capability, and its network speed is determined by received signal strength indicator (RSSI) values related to Wi-Fi between the MIFI device and the mobile terminals, reference signal receiving power (RSRP) values, and reference signal receiving quality (RSRQ) values of the wireless wide area network (WWAN) of the MIFI device.

In order to improve the overall network speed, the entire network sharing system is used to obtain the location of a base station, so that the MIFI device can be moved to be closer to the base station to obtain better connection signal quality.

BRIEF DESCRIPTION OF THE DRAWINGS

Many aspects of the present disclosure can be better understood with reference to the following figures. The components in the figures are not necessarily drawn to scale, the emphasis instead being placed upon clearly illustrating the principles of the present disclosure. Moreover, in the drawings, like reference numerals designate corresponding parts throughout the several views. Implementations of the present technology will now be described, by way of embodiments, with reference to the attached figures, wherein.

DETAILED DESCRIPTION

Figure 1:
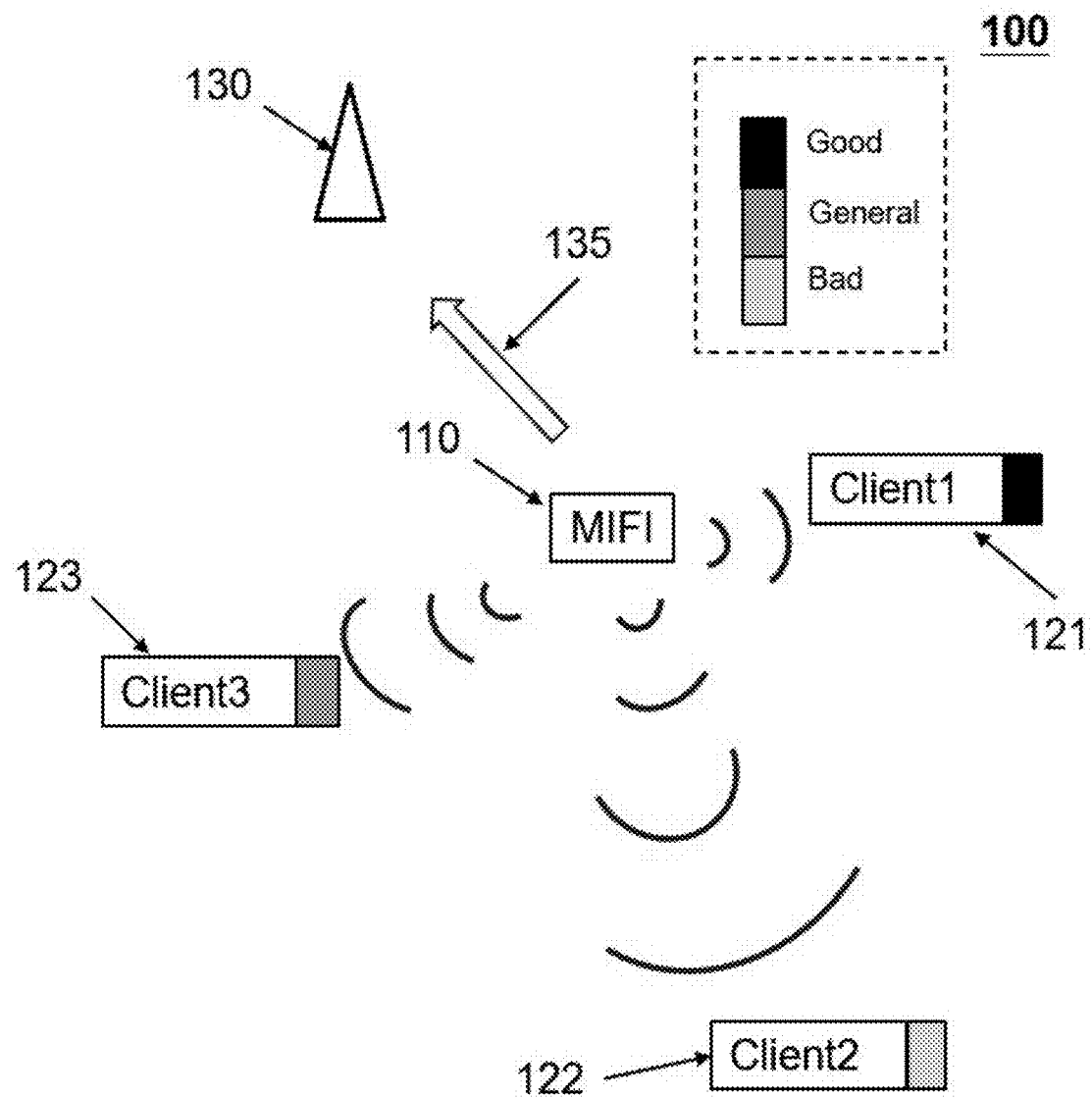
FIG. 1 is a block diagram of an embodiment of an application environment of a MIFI device and mobile terminals of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "comprising," when utilized, means "including, but not necessarily limited to"; it specifically indicates open-ended inclusion or membership in the so-described combination, group, series, and the like.

FIG. 1 is a block diagram of an embodiment of an application environment of a MIFI device and mobile terminals of the present disclosure.

A system for providing better connecting signals 100 comprises a wireless data terminal 100, such as a MIFI device, a first mobile terminal (Client1) 121, a second mobile terminal (Client2) 122 and a third mobile terminal (Client3) 123 and a 4G base station 130. Referring to FIG. 1, the first mobile terminal (Client1) 121 is closest to the MIFI device 110 that has the strongest signal strength. The distance of from the MIFI device 110 is a little smaller than the distance between the first mobile terminal (Client1) 121 and the MIFI device 110 that has weaker signal than the first mobile terminal (Client1) 121. The third mobile terminal (Client3) 123 is the most far from the MIFI device 110 that has the weakest signal than the first mobile terminal (Client1) 121 and the second mobile terminal (Client2) 122. When a calculation process is performed using the embodiment of the method for providing better connecting signals of the present invention, a position providing better network signals can be obtained and the MIFI device 100 is moved toward the 4G base station 130 along the moving direction shown by the arrow 135.

Figure 2:
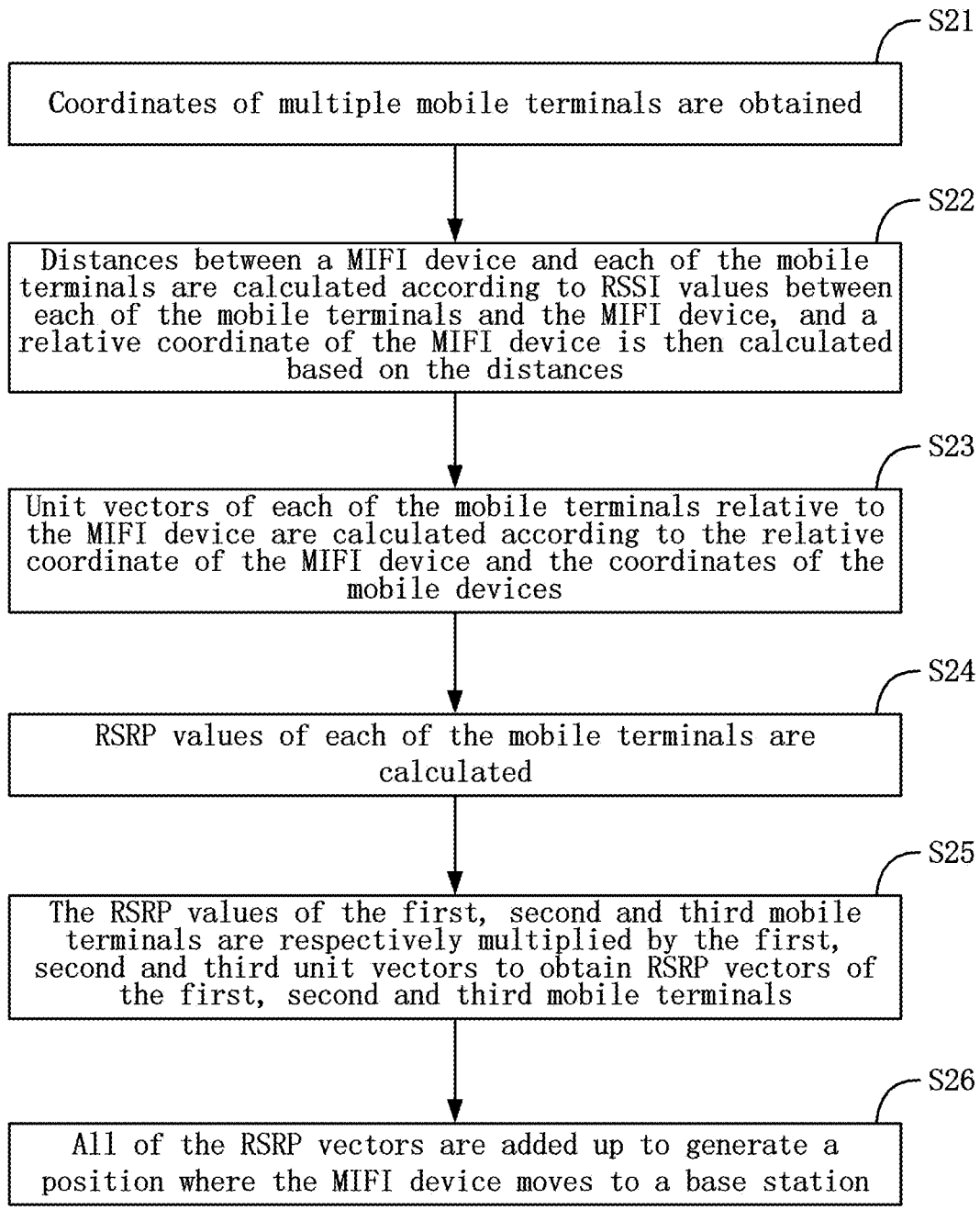
FIG. 2 is a flowchart of an embodiment of a method for providing better connecting signals of the present disclosure.

FIG. 2 is a flowchart of an embodiment of a method for providing better connecting signals executable by a microcontroller of an electronic device of the present disclosure. According to different needs, the order of the steps in the flowchart can be changed, and some steps can be omitted.

In step S21, coordinates of multiple mobile terminals are obtained. In this embodiment, at least three coordinates of three mobile terminals are required for subsequent processing, comprising a first coordinate $(a_0, b_0)$ of a first mobile terminal, a second coordinate $(a_1, b_1)$ of a second mobile terminal and a third coordinate $(a_2, b_2)$ of a third mobile terminal.

In step S22, distances between a mobile Wi-Fi (MIFI) device and each of the mobile terminals are calculated according to received signal strength indicator (RSSI) values between each of the mobile terminals and the MIFI device, and a relative coordinate (A, B) of the MIFI device is then calculated based on the distances using the equations as shown below:

$$(A-a_0)^2 + (B-b_0)^2 = D_0^2;$$

$$(A-a_1)^2 + (B-b_1)^2 = D_1^2;$$

$$\vdots$$

$$(A-a_n)^2 + (B-b_n)^2 = D_n^2, n \geq 3.$$

"n" represents the number of the mobile terminals and three mobile terminals are provided in this embodiment of the present invention. As the greater number of the mobile terminals are provided, the calculated positioning result is more accurate.

It is noted that, in steps S21 and S22, the distances between each of the mobile terminals and the MIFI device and the relative coordinate of the MIFI device are calculated using know methods, the calculation processes of which are not further described herein.

In step S23, unit vectors of each of the mobile terminals relative to the MIFI device are calculated according to the relative coordinate of the MIFI device and the coordinates of the mobile devices, comprising the first unit vector $[x_0, y_0]$ of the first mobile terminal (Client1), the second unit vector $[x_1, y_1]$ of the second mobile terminal (Client2) and the third unit vector $[x_2, y_2]$ of the third mobile terminal (Client3), using the equations as shown below:

$$\text{Unit Vector 0: } [x_0, y_0] = \frac{[A-a_0, B-b_0]}{\sqrt{(A-a_0)^2+(B-b_0)^2}};$$

$$\text{Unit Vector 1: } [x_1, y_1] = \frac{[A-a_1, B-b_1]}{\sqrt{(A-a_1)^2+(B-b_1)^2}};$$

$$\vdots$$

$$\text{Unit Vector } n: [x_n, y_n] = \frac{[A-a_n, B-b_n]}{\sqrt{(A-a_n)^2+(B-b_n)^2}}, n \geq 3.$$

In step S24, reference signal receiving power (RSRP) values of each of the mobile terminals, such as $RSRP_0$, $RSRP_2$ and $RSRP_2$, are calculated. It is noted that the RSRP values of the mobile terminals are calculated using known methods, which is not further described herein.

In step S25, the RSRP values of the first, second and third mobile terminals are respectively multiplied by the first, second and third unit vectors to obtain RSRP vectors of the first, second and third mobile terminals, such as RSRP Vector 0, RSRP Vector 1 and RSRP Vector2.

In step S26, all of the RSRP vectors are added up to generate a position where the MIFI device moves to a base station, which is expressed by Base Station Direction=RSRP Vector 0+RSRP Vector 1+RSRP Vector 2+ . . . +RSRP Vector n.

Figure 3:
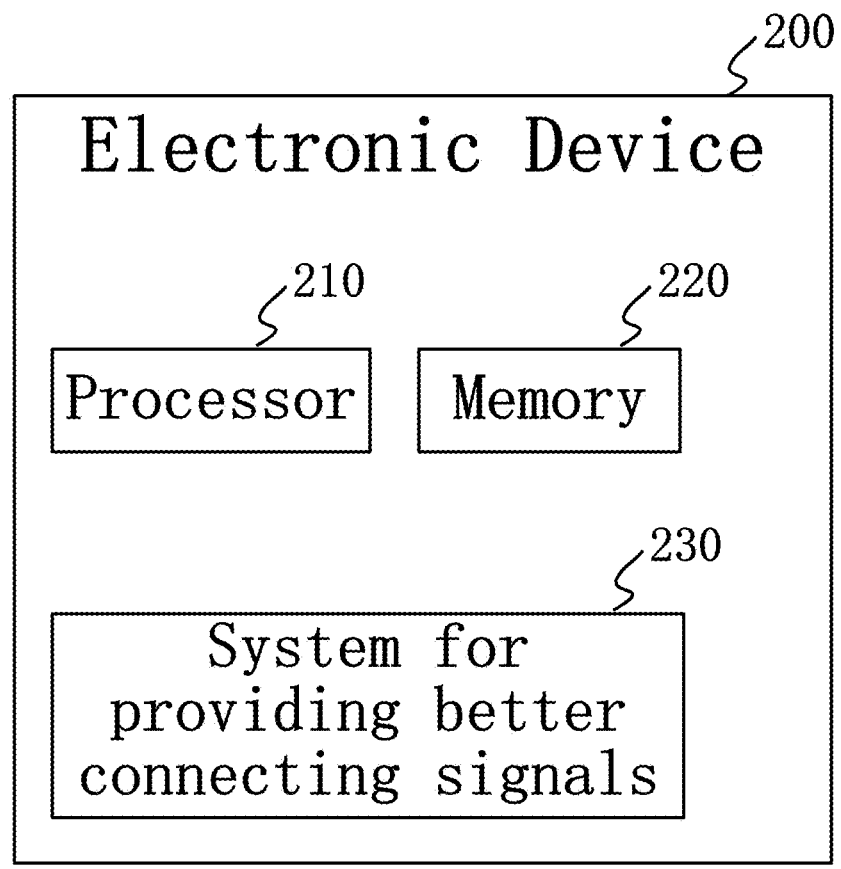
FIG. 3 is a block diagram of an embodiment of the hardware architecture of an electronic device using the method of the present disclosure.

FIG. 3 is a block diagram of an embodiment of the hardware architecture of an electronic device using the method for providing better connecting signals of the present disclosure. The electronic device 200 may be, but is not limited to, connected to a processor 210, a memory 220, and a system for providing better connecting signals 230 via system buses. The electronic device 200 shown in FIG. 3 may include more or fewer components than those illustrated, or may combine certain components.

The memory 220 stores a computer program, such as the system for providing better connecting signals 230, which is executable by the processor 210. When the processor 210 executes the system for providing better connecting signals 230, the blocks in one embodiment of the booting mode configuration method applied in the electronic device 200 are implemented, such as blocks S21 to S26 shown in FIG. 2.

It will be understood by those skilled in the art that FIG. 3 is merely an example of the electronic device 200 and does not constitute a limitation to the electronic device 200. The electronic device 200 may include more or fewer components than those illustrated, or may combine certain components. The electronic device 200 may also include input and output devices, network access devices, buses, and the like.

The processor 210 may be a central processing unit (CPU), or other general-purpose processors, a digital signal processor (DSP), an application specific integrated circuit (ASIC), a Field-Programmable Gate Array (FPGA), or another programmable logic device, discrete gate or transistor logic device, discrete hardware components, or the like. The processor 210 may be a microprocessor or other processor known in the art.

The memory 220 can be used to store the system for providing better connecting signals 230 and/or modules/units by running or executing computer programs and/or modules/units stored in the memory 220. The memory 220 may include a storage program area and a storage data area. In addition, the memory 220 may include a high-speed random access memory, a non-volatile memory such as a hard disk, a plug-in hard disk, a smart memory card (SMC), and a secure digital (SD) card, flash card, at least one disk storage device, flash device, or another volatile solid state storage device.

The system for providing better connecting signals 230 can be partitioned into one or more modules/units that are stored in the memory 220 and executed by the processor 210. The one or more modules/units may be a series of computer program instructions capable of performing particular functions of the system for providing better connecting signals 230.

Figure 4:
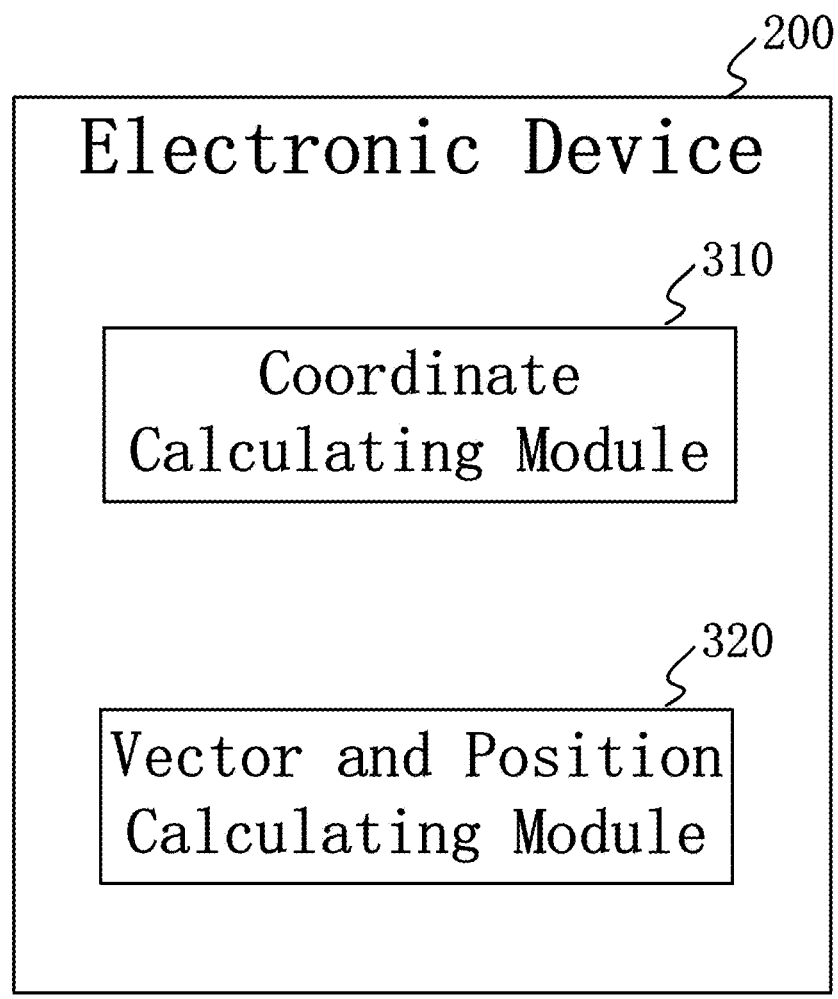
FIG. 4 is a block diagram of an embodiment of functional blocks of the electronic device of the present disclosure.

FIG. 4 is a schematic diagram of an embodiment of functional blocks of the electronic device using the method of the present disclosure.

The electronic device 200, for example, a MIFI device, a mobile terminal or a cloud server, comprises a coordinate calculating module 310 and a vector and position calculating module 320.

The coordinate calculating module 310 obtains coordinates of multiple mobile terminals. In this embodiment, at least three coordinates of three mobile terminals are required for subsequent processing, comprising a first coordinate $(a_0, b_0)$ of a first mobile terminal, a second coordinate $(a_1, b_1)$ of a second mobile terminal and a third coordinate $(a_2, b_2)$ of a third mobile terminal.

The coordinate calculating module 310 calculates distances between a mobile Wi-Fi (MIFI) device and each of the mobile terminals according to received signal strength indicator (RSSI) values between each of the mobile terminals and the MIFI device, and then calculates a relative coordinate (A,B) of the MIFI device based on the distances using the equations as shown below:

$$(A-a_0)^2+(B-b_0)^2=D_0^2;$$

$$(A-a_1)^2+(B-b_1)^2=D_1^2;$$

$$\vdots$$

$$(A-a_n)^2+(B-b_n)^2=D_n^2, n \geq 3.$$

"n" represents the number of the mobile terminals and three mobile terminals are provided in this embodiment of the present invention. As the greater number of the mobile terminals are provided, the calculated positioning result is more accurate.

It is noted that, the distances between each of the mobile terminals and the MIFI device and the relative coordinate of the MIFI device are calculated using know methods, the calculation processes of which are not further described herein.

The vector and position calculating module 320 calculates unit vectors of each of the mobile terminals relative to the MIFI device according to the relative coordinate of the MIFI device and the coordinates of the mobile devices, comprising the first unit vector [$x_0,y_0$] of the first mobile terminal (Client1), the second unit vector [$x_1,y_1$] of the second mobile terminal (Client2) and the third unit vector [$x_2,y_2$] of the third mobile terminal (Client3), using the equations as shown below:

$$\text{Unit Vector 0: } [x_0, y_0] = \frac{[A - a_0, B - b_0]}{\sqrt{(A - a_0)^2 + (B - b_0)^2}};$$

$$\text{Unit Vector 1: } [x_1, y_1] = \frac{[A - a_1, B - b_1]}{\sqrt{(A - a_1)^2 + (B - b_1)^2}};$$

$$\vdots$$

$$\text{Unit Vector } n: [x_n, y_n] = \frac{[A - a_n, B - b_n]}{\sqrt{(A - a_n)^2 + (B - b_n)^2}}, n \geq 3.$$

The vector and position calculating module 320 calculates reference signal receiving power (RSRP) values of each of the mobile terminals, such as $RSRP_0$, $RSRP_2$ and $RSRP_2$. It is noted that the RSRP values of the mobile terminals are calculated using known methods, which is not further described herein.

The vector and position calculating module 320 respectively multiplies the RSRP values of the first, second and third mobile terminals by the first, second and third unit vectors to obtain RSRP vectors of the first, second and third mobile terminals, such as RSRP Vector 0, RSRP Vector 1 and RSRP Vector2.

The vector and position calculating module 320 adds all of the RSRP vectors up to generate a position where the MIFI device moves to a base station, which is expressed by Base Station Direction=RSRP Vector 0+RSRP Vector 1+RSRP Vector 2+ . . . +RSRP Vector n.

It is to be understood, however, that even though numerous characteristics and advantages of the present disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A method of providing improved connecting signals executable by an electronic device, the method comprising:
   obtaining coordinates of at least a first mobile terminal, a second mobile terminal and a third mobile terminal;
   calculating distances between a mobile Wi-Fi (MIFI) device and the first, second and third mobile terminal according to received signal strength indicator (RSSI) values between the first, second and third mobile terminals and the MIFI device to obtain a relative coordinate of the MIFI device based on the distances;
   calculating a first unit vector of the first mobile terminal, a second unit vector of the second mobile terminal and a third unit vector of the third mobile terminals relative to the MIFI device according to the relative coordinate of the MIFI device and the coordinates of the first, second and third mobile devices;
   calculating a first reference signal receiving power (RSRP) value of the first mobile terminal, a second RSRP value of the second mobile terminal and a third RSRP value of the third mobile terminal;
   multiplying the first, second and third RSRP values by the first, second and third unit vectors to obtain a first RSRP vector of the first mobile terminal, a second RSRP vector of the second mobile terminal and a third RSRP vector of the third mobile terminal; and
   adding the first, second and third RSRP vectors up to generate a position where the MIFI device moves to a base station.

2. An electronic device comprising:
   a coordinate calculating module configured to obtain coordinates of at least a first mobile terminal, a second mobile terminal and a third mobile terminal, and calculate distances between a mobile Wi-Fi (MIFI) device and the first, second and third mobile terminal according to received signal strength indicator (RSSI) values between the first, second and third mobile terminals and the MIFI device to obtain a relative coordinate of the MIFI device based on the distances; and
   a vector and position calculating module configured to calculate a first unit vector of the first mobile terminal, a second unit vector of the second mobile terminal and a third unit vector of the third mobile terminals relative to the MIFI device according to the relative coordinate of the MIFI device and the coordinates of the first, second and third mobile devices, calculate a first reference signal receiving power (RSRP) value of the first mobile terminal, a second RSRP value of the second mobile terminal and a third RSRP value of the third mobile terminal, multiply the first, second and third RSRP values by the first, second and third unit vectors to obtain a first RSRP vector of the first mobile terminal, a second RSRP vector of the second mobile terminal and a third RSRP vector of the third mobile terminal, and add the first, second and third RSRP vectors up to generate a position where the MIFI device moves to a base station.

3. A non-transitory computer-readable storage medium storing game program which causes a computer to execute:
   a process of collecting obtaining coordinates of at least a first mobile terminal, a second mobile terminal and a third mobile terminal;
   a process of collecting calculating distances between a mobile Wi-Fi (MIFI) device and the first, second and third mobile terminal according to received signal strength indicator (RSSI) values between the first, second and third mobile terminals and the MIFI device to obtain a relative coordinate of the MIFI device based on the distances;
   a process of collecting calculating a first unit vector of the first mobile terminal, a second unit vector of the second mobile terminal and a third unit vector of the third mobile terminals relative to the MIFI device according to the relative coordinate of the MIFI device and the coordinates of the first, second and third mobile devices;
   a process of collecting calculating a first reference signal receiving power (RSRP) value of the first mobile terminal, a second RSRP value of the second mobile terminal and a third RSRP value of the third mobile terminal;

a process of collecting multiplying the first, second and third RSRP values by the first, second and third unit vectors to obtain a first RSRP vector of the first mobile terminal, a second RSRP vector of the second mobile terminal and a third RSRP vector of the third mobile terminal; and a process of collecting adding the first, second and third RSRP vectors up to generate a position where the MIFI device moves to a base station.

* * * * *